Figure 1:
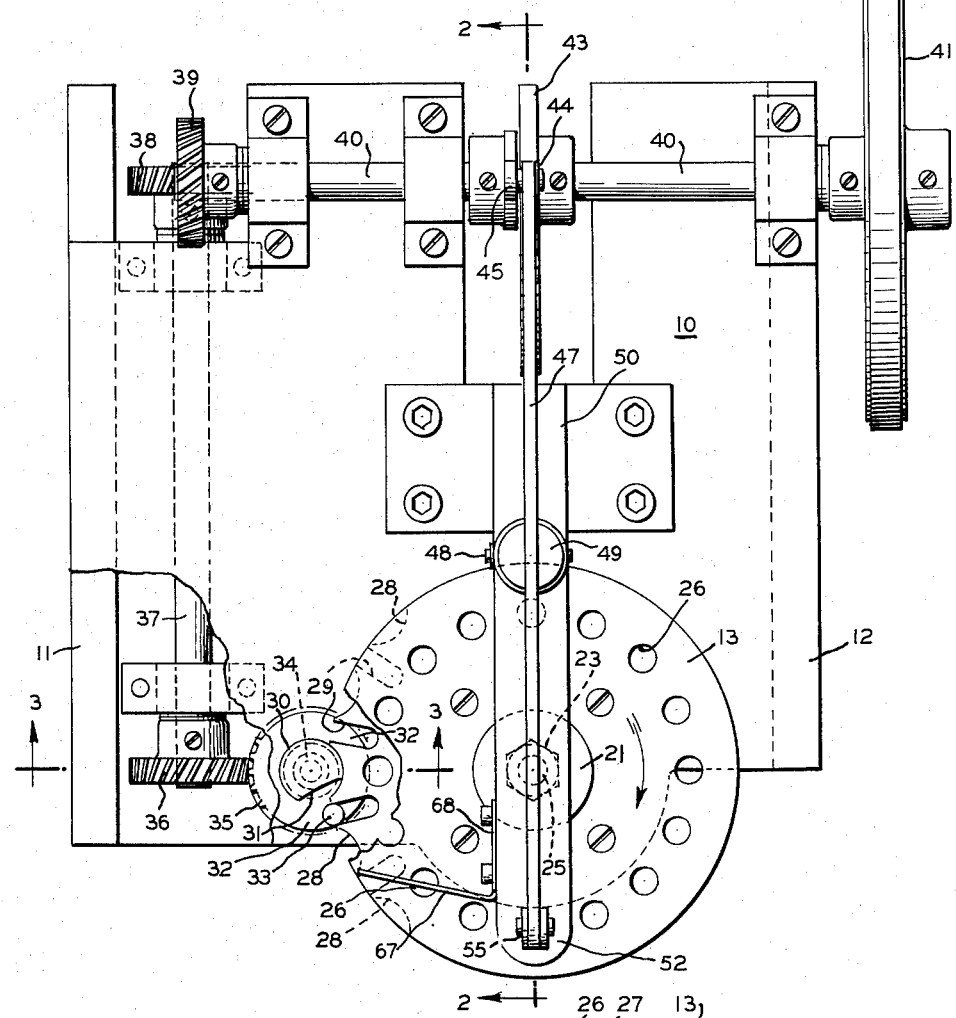

Feb. 14, 1961 A. BERGLUND 2,971,253
CORE SLEEVING MACHINE
Filed Feb. 25, 1958 2 Sheets-Sheet 1

INVENTOR
ARTHUR BERGLUND
BY Clyde A. Norton +
Robert J. Hulsizer
ATTORNEY

Feb. 14, 1961   A. BERGLUND   2,971,253
CORE SLEEVING MACHINE
Filed Feb. 25, 1958   2 Sheets-Sheet 2

INVENTOR
ARTHUR BERGLUND
BY Clyde A. Norton
Robert J. Hulsizer
ATTORNEY

United States Patent Office 2,971,253
Patented Feb. 14, 1961

2,971,253

CORE SLEEVING MACHINE

Arthur Berglund, Boca Raton, Fla., assignor to Sperry Rand Corporation, New York, N.Y., a corporation of Delaware Filed Feb. 25, 1958, Ser. No. 717,417

3 Claims. (Cl. 29—234)

This invention relates to new and useful improvements in a machine for semi-automatically disposing covering sleeves onto cores of magnetic memory devices.

In the manufacture of magnetic memory cores there is often used a stainless steel hollow core with upright circular side flanges. Around the body of the core is generally wrapped a series of layers of magnetic foil of any suitable material such as molybdenum alloy. In order to protect this foil from stress or strain or contact with any substances which might set up stresses and strains therein, a sleeve preferably of plastic material is slipped over the core to embrace the flanges but out of contact with the foil to protect the same for the reasons above mentioned. In view of the fact that the magnetic memory cores are most often very small, it is an exceedingly laborious, slow and expensive proceeding to so dispose these sleeves on the cores by a manual operation.

The object of the invention is to provide a machine semi-automatic in nature by means of which one operator may apply sleeves to thousands of cores in a day.

Briefly, the invention generally comprises a rotatable table adjacent the periphery of which are disposed a circular series of spaced apertures. This table is stepped around by a suitable mechanism, such as a Geneva motion, to dispose the successive apertures beneath and in line with a reciprocatory ram which is synchronously operated with the stepping of the table. The operator seated adjacent the table places in each aperture thereon before it comes beneath the ram, an arbor on which are disposed the cover sleeve and the core and as the ram descends it forces the arbor down through the aperture by pressure on the core; and in so doing forces the core into the sleeve, allowing the arbor to drop down out of the aperture to be provided by the operator with a new sleeve and core to be placed in the next empty aperture on the table. The arbor, which is one element of the novel combination of elements forming the invention, has a larger diameter which slidably fits into the table aperture and over the upper enlarged position of which this the sleeve is placed, the diameter of the sleeve being slightly larger than the aperture so that the arbor is thus supported within the aperture. The lower end of the arbor is tapered. The upper end of the arbor is of reduced diameter to form a spindle which passes through the center hole in the core which is disposed thereon, the lower flange of the core resting on the shoulder of the arbor between the larger and the reduced diameter thereof. The upper flange of the core is engaged by the ram as it moves down. As the arbor is forced down by the core and drops out of the aperture in the table the core with the sleeve thereon is left on top of the table and, as the table is then stepped around, the core thereon is brushed off the table by a wiper plate and drops into a suitable receptacle.

Figure 3:
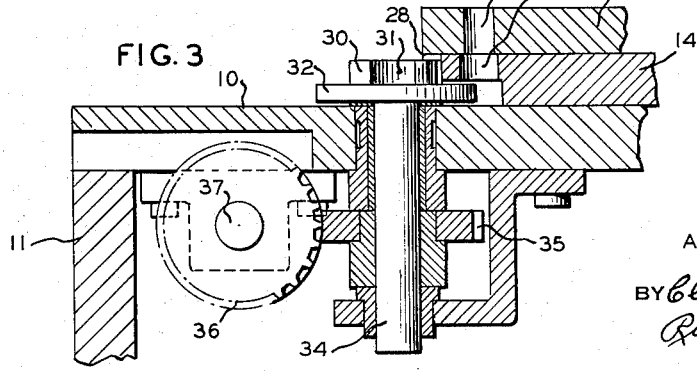
Figure 2:
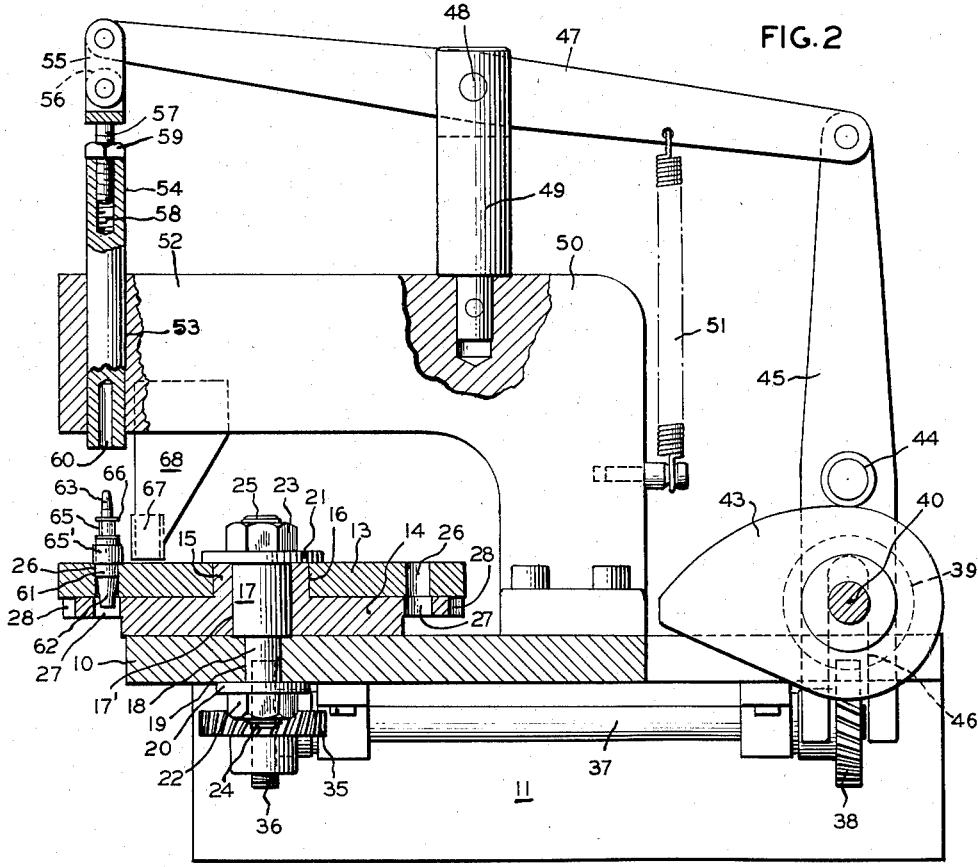
Figure 4:
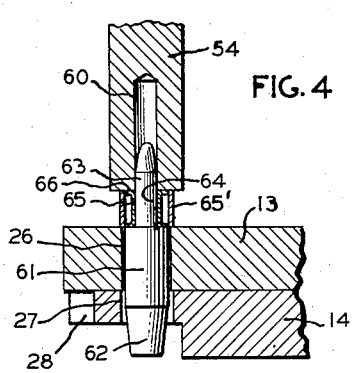
Figure 5:
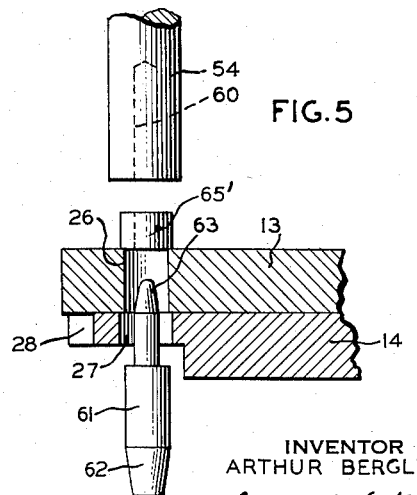

A present preferred form which the invention may assume is illustrated in the drawings, of which Fig. 1 is a plan view of the device;
Fig. 2 is a longitudinal vertical section taken on the line 2—2 of Fig. 1;

Fig. 3 is a transverse vertical section taken on the line 3—3 of Fig. 1;
Fig. 4 is a detail view showing the ram in fully operated position with the sleeve disposed in position on the core; and
Fig. 5 is a similar view showing the ram retracted and the supporting plug dropping away from the table.

Referring to the drawings, there is a base plate 10 with dependent supporting edge flanges 11 and 12. On the base plate, adjacent one edge, there is disposed a rotatable turntable composed of two plates 13 and 14. The plate 14 has an upright bushing 15 tight-fitted into a central aperture 16 in the plate 13. A stub shaft has a portion 17 of larger diameter loose-fitted in the bore 17' of the plate 14 and portion 18 of reduced diameter extending through an aperture 19 in the base plate 10. A washer 20 is disposed around the lower end of the stub shaft and bears against the lower face of the base plate 10, and a washer 21 is disposed around the upper end of the stub shaft and bears against the upper face of the portion 17 of the stub shaft but is slightly spaced from the upper faces of the bushing 15 and the plate 13. Nuts 22 and 23 are disposed around the threaded lower and upper ends 24 and 25 of the stub shaft. When the lower nut 22 is tightened, it clamps the portion 17 tightly against the base plate 10. When the upper nut 23 is tightened it holds the washer 21 tightly against the upper face of the portion 17 but does not prevent the rotation of plates 13 and 14. It will be noted that in Fig. 2 the outer edges of the plates 13 and 14 extend beyond the outer edge of the base plate 10. Adjacent the periphery the plate 13 has a spaced series of apertures 26 arranged in a circular line and of a predetermined diameter. The plate 14 also has a similar series of apertures 27 of larger diameter alined with the apertures 26 as shown.

In order to rotate the turn table, it will be noted that the periphery of the plate 14 is provided with an alternate series of arcuate recesses 28 and elongate radial slots 29 (Fig. 1). These cooperate with a circular disk 30 with an arcuate cut-out portion 31 and a larger lower circular disk 32 having thereon a pin 33. The disk 30 cooperates with the arcuate recesses 28 and the pin 33 with the elongate slots 29 in the manner of the well-known Geneva movement so that as the shaft 34 on which said disks are mounted is continuously turned the table will be intermittently stepped around.

The shaft 34 has fixed thereon a spiral gear 35 meshing with a spiral gear 36 fixed to a shaft 37 on the other end of which is a spiral gear 38 meshing with another spiral gear 39 on a shaft 40. The other end of shaft 40 has fixed thereto a pulley 41 driven by a belt 42 from any suitable source of power not shown. Intermediate the ends of shaft 40 there is fixed thereto a cam 43 adapted to contact and operate a roller 44 disposed on the side of a link 45, the lower end of which is forked at 46 to embrace the shaft 40.

The upper end of the link 45 is pivotally connected to a rocker arm 47 pivoted at 48 on a pin extending across a bifurcated upper portion of a post 49 which is suitably supported on the upper surface of a pedestal member 50 bolted to the top of the base plate 10. A spring 51 extends from the rocker arm 47 to the side of the pedestal 50 and tends to hold the roller 44 against the cam 43. The pedestal 50 has a portion 52 extending horizontally over the table and provided with a bore 53 directly over the position occupied by an aperture 26 when it is at rest. It will be seen, therefore, that each aperture 26 will be brought successively under and in line with the bore 53 as the table is intermittently operated.

To the other end of the rocker arm 47 there is pivotally connected a ram element 54. A pair of flat straps 55 are pivotally pinned to the end of the rocker arm 47 and dependent therefrom. A single strap 56 is pivotally pinned between the straps 55 and it has a dependent screw stem 57 extending into a threaded bore 58 of the ram 54. A lock nut 59 is used to hold the ram in any adjusted position with respect to the stem 57. The lower end of the ram 54 has a central bore 60 for reasons subsequently given.

In order to force a plastic sleeve onto the core of the magnetic memory device, there is provided an arbor shown in Fig. 5 comprising a shank 61 of a diameter to slide freely in the aperture or hole 26 of the table, a lower tapered portion 62 and an upper reduced extension 63 of a diameter to pass into the bore 60 of the ram 54 and through a central aperture 64 in the core member 65 which has side or upper and lower flanges 66. In the operation of the device, sleeve 65' is slipped onto the upper part of portion 61 of the arbor as shown in Fig. 2 and by reason of a relatively close friction fit will support the arbor in the hole 26 of the table. The core member 65 is then slipped onto the portion 63 of the arbor with a free sliding fit and the lower flange of said core member rests on the shoulder formed on the upper end of the portion 61 of the arbor. The arbor, with the elements mentioned thus mounted thereon, is placed in one of the apertures 26 of the table and is supported therein by the sleeve 65'. The operator places an arbor with the mounted elements in each of the apertures 26. As an aperture 26 with the parts thus disposed therein is stepped around to be disposed beneath the ram 54, the table is momentarily stopped and the ram 54 descends and bears against the upper flange of the core and pushes it into the sleeve 65' and at the same time said core pushes the arbor down. When the core is fully disposed within the sleeve and tightly gripped thereby and the ram is at its lowest position, the upper end of the arbor will be pushed out of the sleeve and will be free to drop by gravity through the apertures in the table and fall into a suitable receptacle, leaving the core with the sleeve tightly mounted thereon resting on top of the table as shown in Fig. 5. As the table is then stepped to bring the next aperture 26 beneath the ram with its mounted parts disposed therein, the core previously provided with a sleeve will pass around one step and be engaged by a sloping wiper arm 67 which is mounted on a bracket plate 68 fastened to the arm of the pedestal portion 52 as shown in Fig. 2. The core with its sleeve will then also drop into a convenient receptacle.

In summarizing the operation, it is to be noted that the operator fills the series of apertures 26 with the arbors on which are already disposed the sleeves 65' and the cores 65 in the manner above described. With the power turned on, the cam 43 is rotated and operates the linkage to reciprocate the ram 54. At the same time the Geneva motion above described steps the table around to bring successive apertures 26 under the ram and the table is stopped long enough for the ram to operate on the sleeve and core to force it into the sleeve and at the same time force the arbor down through the aperture. After this the table is again stepped to bring the next aperture in line with the ram and the operation above described is repeated. The operator is able to keep filling the empty apertures with arbors on which the sleeves and cores have been previously mounted so that there is no interruption to the continuous operation of the machine and many thousands of sleeved cores can thus be produced in a day. The arbors drop into a suitable receptacle for subsequent use and the sleeved cores drop into a suitable receptacle.

While the invention herein has been fully shown and described in detail with respect to one present preferred form which it may assume, it is not to be limited to the specific form shown since many changes and modifications may be made in the structure to meet different practical problems without departing from the spirit and scope of the invention in its broadest aspects. Hence it is desired to cover any and all forms and modifications of the invention which may come within the spirit and scope of any one or more of the appended claims.

What I claim is:

1. In a machine for assembling a flanged core member and a covering sleeve member adapted to fit closely over said core member, a work table having a cylindrical aperture therethrough for slidably receiving an arbor member, an arbor member adapted to fit within said aperture, said arbor comprising a first cylindrical section having an external diameter such that a covering sleeve frictionally grips said first section when placed thereover, the diameter of said aperture being slightly larger than the external diameter of said first section and smaller than the external diameter of said sleeve whereby said arbor may be supported within said aperture by the sleeve resting on said table, said first section being of a length to extend substantially below the sleeve and into said aperture to maintain said members and said aperture in firm alignment, said arbor having a second section having an external diameter slightly less than the internal diameter of a core member, said first and second sections of said arbor being coaxial whereby a core and a sleeve supported by said arbor are automatically maintained in coaxial relationship, and means positioned coaxially with said aperture and movable longitudinally for forcing said core into said sleeve and said arbor farther into said aperture and free of said sleeve.

2. The invention of claim 1 in which the table has a circular series of apertures adjacent its periphery to receive the arbors, said means for forcing said core and arbor comprising a ram disposed in line with the axis of one of said apertures, means for stepping the table around step by step to bring successive apertures in axial alinement with the axis of the ram, and means for moving the ram longitudinally during the period of rest of the table to force the core into the sleeve and the arbor down through the aperture.

3. The invention of claim 1 in which the core is in the form of a shell having side flanges and a central aperture to fit over the second section of the arbor, the outer diameter of the core flanges being equal to the inner diameter of the sleeve.

References Cited in the file of this patent
UNITED STATES PATENTS

| | | |
|---|---|---|
| 1,739,270 | Thiry | Dec. 10, 1929 |
| 1,964,434 | Holmes et al. | June 26, 1934 |
| 2,329,000 | Rembert | Sept. 7, 1943 |
| 2,572,215 | Swart | Oct. 23, 1951 |
| 2,604,692 | Broden | July 29, 1952 |
| 2,640,617 | Spicer | June 2, 1953 |
| 2,840,893 | Peppercorn et al. | July 1, 1958 |